(12) United States Patent
Tanju et al.

(10) Patent No.: US 7,971,651 B2
(45) Date of Patent: Jul. 5, 2011

(54) SHAPE MEMORY ALLOY ACTUATION

(75) Inventors: Baha Tulu Tanju, Humble, TX (US);
Peter J. Worman, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 31 days.

(21) Appl. No.: 12/262,750

(22) Filed: Oct. 31, 2008

(65) Prior Publication Data

US 2009/0139727 A1    Jun. 4, 2009

Related U.S. Application Data

(60) Provisional application No. 60/984,872, filed on Nov. 2, 2007.

(51) Int. Cl.
*E21B 34/06* (2006.01)

(52) U.S. Cl. .................... 166/373; 166/66.7; 166/332.8; 251/11

(58) Field of Classification Search .................. 166/373, 166/66.7, 332.8, 302, 57, 332.2; 251/11, 251/213
See application file for complete search history.

(56) References Cited

U.S. PATENT DOCUMENTS

| | | | |
|---|---|---|---|
| 4,161,219 A | | 7/1979 | Pringle |
| 4,619,320 A | * | 10/1986 | Adnyana et al. ............. 166/66.7 |
| 4,899,543 A | * | 2/1990 | Romanelli et al. ............... 60/527 |
| 4,973,024 A | * | 11/1990 | Homma .......................... 251/11 |
| 5,119,555 A | * | 6/1992 | Johnson .......................... 29/254 |
| 5,211,371 A | * | 5/1993 | Coffee ............................ 251/11 |
| 5,641,364 A | | 6/1997 | Golberg et al. .............. 148/563 |
| 5,865,418 A | * | 2/1999 | Nakayama et al. ............. 251/11 |
| 6,321,845 B1 | | 11/2001 | Deaton |
| 6,478,090 B2 | | 11/2002 | Deaton |
| 6,746,552 B2 | * | 6/2004 | Homma ........................ 148/563 |
| 6,840,257 B2 | * | 1/2005 | Dario et al. ......................... 137/9 |
| 2004/0173362 A1 | | 9/2004 | Waithman et al. |
| 2005/0173661 A1 | * | 8/2005 | Mignon et al. .................. 251/11 |
| 2005/0230118 A1 | | 10/2005 | Noske et al. |
| 2006/0048936 A1 | * | 3/2006 | Fripp et al. ................. 166/244.1 |

* cited by examiner

*Primary Examiner* — William P Neuder
*Assistant Examiner* — Blake Michener
(74) *Attorney, Agent, or Firm* — Merchant & Gould

(57) ABSTRACT

An actuator for use in actuating a valve to control the flow of fluids through the valve, the valve having a valve member movable between positions opening and closing the valve. The actuator comprises one or more shape memory alloy elements each being transformable from a martensitic to an austenitic state by applying heat energy to achieve an austenitic transformation. The one or more shape memory alloy elements are connected to the valve member such that austenitic transformation of the one or more shape memory alloy elements induces movement of the valve member from its closing position to its opening position.

27 Claims, 5 Drawing Sheets

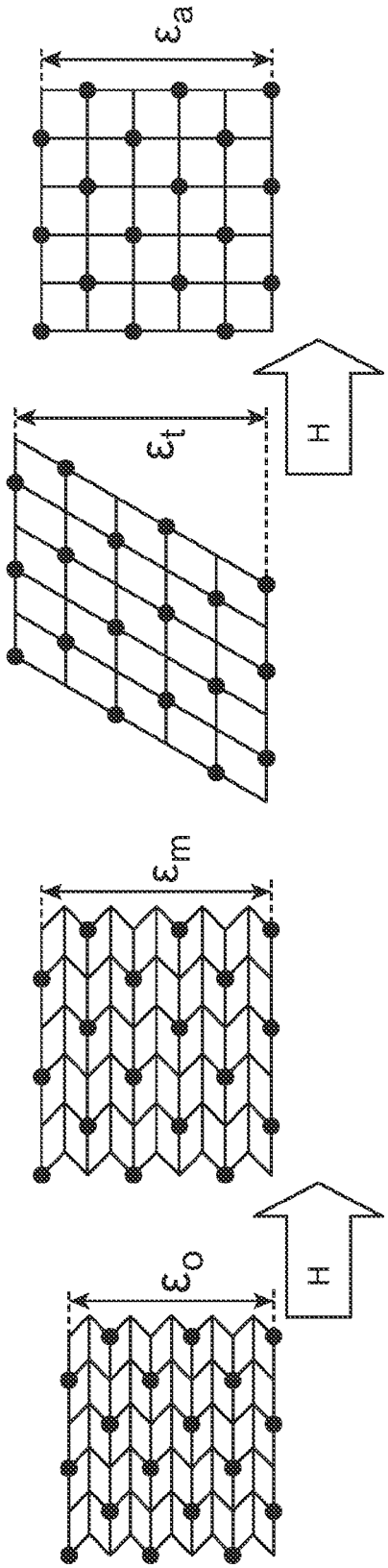

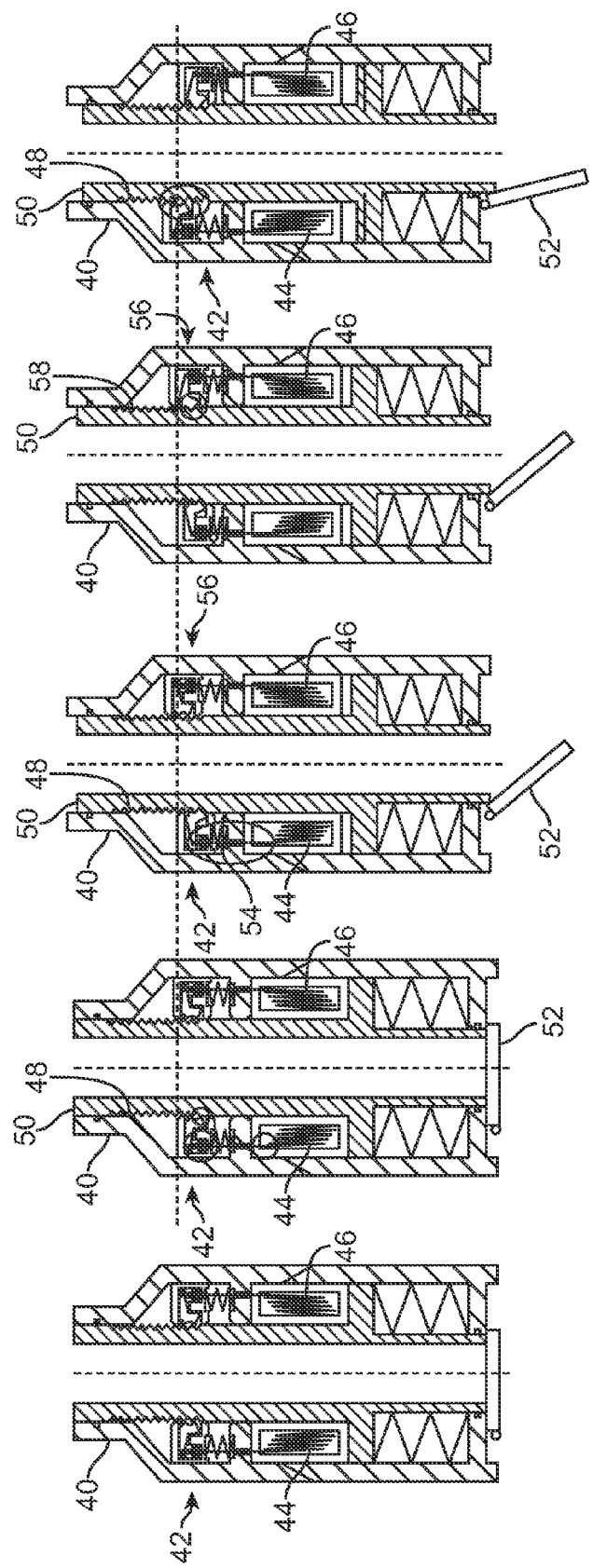

SHAPE MEMORY ALLOY ACTUATION

FIELD

The present disclosure relates to valves, such as subsurface safety valves, that are adapted for downhole use in controlling fluid flow in tubing or conduit disposed in a wellbore penetrating subsurface strata, and more particularly relates to the actuation of such valves in wellbores that are characterized by high temperatures and high pressures.

BACKGROUND

Various types of valve apparatus are used in various wellbore types (e.g., subsea, platform, land-based) to control fluid flow through tubing or conduits disposed therein. One such valve is referred to as a subsurface safety valve, or simply as a safety valve, and it provides a "fail-safe" mechanism for closing the wellbore to prevent the uncontrolled release of hydrocarbons or other downhole fluids. Such safety valves are typically actuated in emergency situations, such as blowouts, to provide a pressure barrier (oftentimes in cooperation with blowout preventers) and safeguard local personnel, equipment, and the environment.

U.S. Pat. No. 4,161,219 discloses a safety valve configuration that employs a flapper valve that is spring-biased towards a position closing a fluid passageway in the safety valve body, and a flow tube that is movable between a first position yielding the biasing spring of the flapper valve to open the flapper valve and a second position permitting the biasing spring of the flapper valve to close the flapper valve. The flow tube is also spring biased towards the second position that releases the flapper valve, but the flow tube is normally urged towards the first position in which the flapper valve is opened by the application of hydraulic fluid pressure from the surface. In the event of an emergency, such as a blowout, the hydraulic fluid pressure is reduced to permit the spring bias of the flow tube to urge the flow tube towards its second position, thereby releasing the flapper valve so that its biasing spring urges the flapper valve towards the position closing the fluid passageway.

It is commonly believed today that most of the remaining oil and gas reserves of considerable substance are located in so-called "deep water" or "ultra-deep water" subsurface formations. Such formations may lie underneath 7000 feet or more of water and up to 30,000 feet or more beneath the seafloor. Some industry experts predict that by the year 2015, 25% or more of offshore oil production will be sourced from deepwater wellbores. As deepwater wells are drilled to greater depths, they begin to encounter extreme high pressure, high temperature conditions (i.e., having an initial reservoir pressure greater than approximately 10 kpsi (69 Mpa) or reservoir temperature greater than approximately 300° F. (149° C.)) that constitute one of the greatest technical challenges facing the oil and gas industry today. As. a result, materials that have been used for many years now face unique and critical environmental conditions for which they may not be suitable.

A clear example of such material challenges is found in hydraulic fluids, which are used in a number of downhole applications including safety valve actuation as described above. Hydraulic fluids will suffer a breakdown or stagnation when exposed to high temperatures over time (safety valves can sit dormant downhole for decades) that severely compromises the hydraulic properties of such fluids, rendering them incapable of functioning for their intended hydraulic purposes. Additionally, hydraulically-actuated safety valves are subject to seal failure over time that reduces their performance and reliability.

Therefore, a need exists for a means of reliably actuating valves such as safety valves in downhole environments, particularly in the high pressure, high temperature environments of deepwater wellbores.

SUMMARY

The above-described needs, problems, and deficiencies in the art, as well as others, are addressed by the present disclosure in its various aspects and embodiments. In one aspect, the present disclosure provides an actuator for use in actuating a valve to control the flow of fluids through the valve. The valve has a valve member movable between positions opening and closing the valve. The actuator comprises one or more shape memory alloy elements, each being transformable from a martensitic to an austenitic state by applying heat energy sufficient to achieve an austenitic transformation. The one or more shape memory alloy elements are connected to the valve member such that austenitic transformation of the one or more shape memory alloy elements induces movement of the valve member from its closing position to its opening position. The austenitic transformation may occur in a temperature range between $A_s$, a start temperature of the austenitic transformation, and $A_f$, a finish temperature of the austenitic transformation, with $A_s$ being higher than ambient temperature. The austenitic transformation may effect a contraction of the one or more shape memory alloy elements so as to induce movement of the valve member from its closing position to its opening position.

Each shape memory alloy element may be transformable from an austenitic state to a martensitic state by removing sufficient heat energy to achieve a martensitic transformation, such that martensitic transformation of the one or more shape memory alloy elements induces movement of the valve member from its opening position to its closing position. The martensitic transformation may occur in a temperature range between $M_s$, a start temperature of a martensitic transformation, and $M_f$, a finish temperature of the martensitic transformation, with $M_f$ being higher than ambient temperature. The martensitic transformation may effect an expansion of the one or more shape memory alloy elements so as to induce movement of the valve member from its opening position to its closing position.

In a further aspect, the present disclosure provides a subsurface valve for controlling the flow of fluids through a wellbore. The subsurface valve comprises a valve body adapted for disposal in the wellbore and having a fluid flowpath therethrough, a valve member movably carried by the valve body between positions opening and closing the fluid flowpath, and one or more shape memory alloy elements each being transformable from a martensitic to an austenitic state by applying heat energy to achieve an austenitic transformation. The one or more shape memory alloy elements are connected to the valve member such that austenitic transformation of the one or more shape memory alloy elements induces movement of the valve member from its closing position to its opening position.

In particular embodiments, the valve member comprises a flow tube.

In particular embodiments, the safety valve may further comprise a control line for conducting heat energy from the surface to the one or more shape memory alloy elements. The control line may comprise one or more electrically conductive pathways for conducting electrical current across the one or more shape memory alloy elements. The one or more shape memory alloy elements exhibit sufficient electrical resistance to generate sufficient heat energy under typical voltage ranges for subsea applications so as to achieve an austenitic transformation.

In particular embodiments, the one or more shape memory alloy elements comprises two or more ultra-high temperature shape memory alloy assemblies each having a plurality of cascading ultra-high temperature shape memory alloy elements disposed in a thermally insulated housing carried within the valve body. Each of the cascading ultra-high temperature shape memory alloy elements may be suitable to operate in wellbore ambient temperatures up to 428° F. (220° C.). Each shape memory alloy element may comprise a NiTiPd alloy.

In particular embodiments, the one or more shape memory alloy elements are disposed in pressure balanced housing carried within the valve body, the housing comprising a temperature expansion compensator therefore that is suitable for high pressure, high temperature wellbore applications.

In particular embodiments, the two or more ultra-high temperature shape memory alloy assemblies are operatively coupled to a ratchet mechanism for inducing movement of the valve member.

In a further aspect, the present disclosure provides a method for actuating a valve disposed in a wellbore to control the flow of fluids through the wellbore, with the valve having a valve member movable between positions opening and closing the valve. The method comprises the steps of connecting the valve member to one or more shape memory alloy elements each being transformable from a martensitic to an austenitic state by applying heat energy, and applying sufficient heat energy to the one or more shape memory alloy elements to achieve an austenitic transformation, whereby the austenitic transformation of the one or more shape memory alloy elements induces movement of the valve member from its closing position to its opening position.

In particular embodiments, the heat energy-applying step comprises establishing one or more pathways for conducting electrical current across the one or more shape memory alloy elements, and applying voltage across the one or more shape memory alloy elements via the one or more pathways so as to generate sufficient heat energy to achieve an austenitic transformation. The voltage may be provided via an electrical supply selected from a group comprising AC, DC and high voltage pulse width modulation.

BRIEF DESCRIPTION OF THE DRAWINGS

So that the above recited features and advantages of the present disclosure can be understood in detail, a more particular description of the summary above may be had by reference to the embodiments thereof that are illustrated in the appended drawings. It is to be noted, however, that the appended drawings illustrate only typical embodiments and are therefore not to be considered limiting, for the present disclosure may admit to other equally effective embodiments.

FIGS. 3A-3D are schematics of crystal structures with major material properties for shape memory alloys.

FIGS. 4A-4E are sequential sectional views, in elevation, of a subsurface safety valve being actuated between closed and opened positions via a ratcheting assembly coupled with linear actuation via a shape memory alloy assembly comprised of cascading ultra-high temperature shape memory alloy elements.

DETAILED DESCRIPTION

FIGS. 1A-1D are sequential sectional views, in elevation, of a subsurface safety valve 10 being actuated between closed and opened positions via linear actuation via a shape memory alloy assembly comprised of cascading ultra-high temperature shape memory alloy elements 12. As used herein, "cascading" ultra-high temperature shape memory alloy elements 12 refer to multiple wire-shaped ultra-high temperature shape memory alloy elements linked in a serial mechanical connection that combines the stroke displacement of the individual ultra-high temperature shape memory alloy elements in additive fashion to achieve a relatively long output stroke. Thus, the individual ultra-high temperature shape memory alloy elements 12 may be assembled in a small volume, but provide a cumulative maximum stroke displacement. As used herein, an "ultra-high temperature" shape memory alloy refers to a shape memory alloy whose phase change range starts at 300° F. and higher, in comparison to a "conventional" shape memory alloy whose phase change range is approximately 122° F. to 194° F. An example of an ultra-high temperature shape memory alloy is NiTiPd.

Figure 1A:
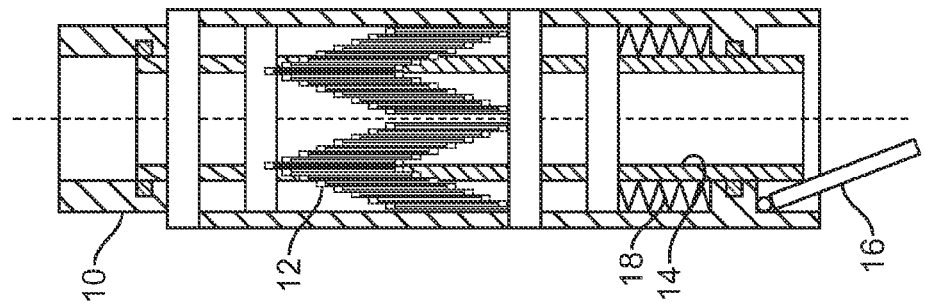
FIGS. 1A-1D are sequential sectional views, in elevation, of a subsurface safety valve being actuated between closed and opened positions via linear actuation via a shape memory alloy assembly comprised of cascading ultra-high temperature shape memory alloy elements.
Figure 1B:
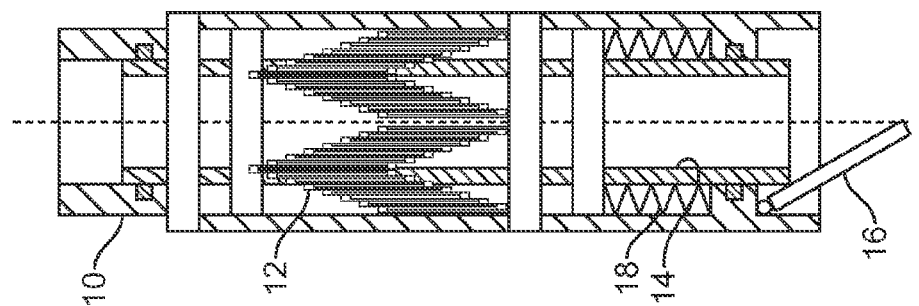
Figure 1C:
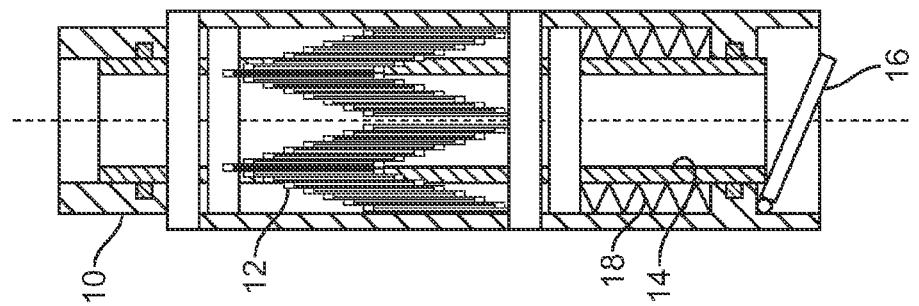
Figure 1D:
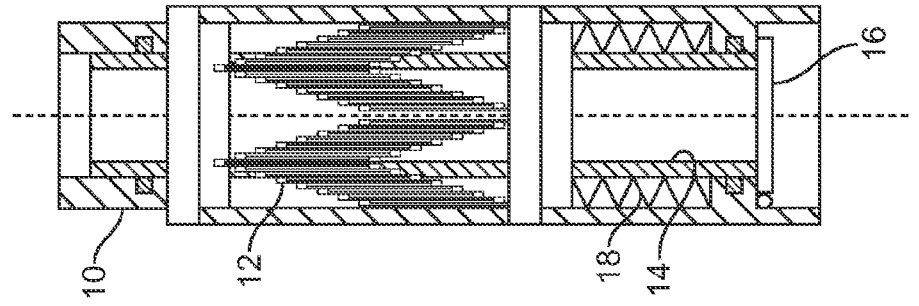

In particular, FIG. 1A shows the subsurface safety valve 10, comprising cascading ultra-high temperature shape memory alloy elements 12, in a closed position with the cascading ultra-high temperature shape memory alloy elements deactivated, while FIGS. 1B-1D show the subsurface safety valve 10 opening. The cascading ultra-high temperature shape memory alloy elements 12 are activated in FIGS. 1B-1D and thus contracting (with increasing degrees of activation and contraction illustrated in series in FIGS. 1B, 1C, and 1D). As a result of the activation of the cascading ultra-high temperature shape memory alloy elements 12, an inner drive sleeve (or flow tube) 14 of the valve 10, to which the cascading ultra-high temperature shape memory alloy elements 12 are attached, is pulled down by the contracting cascading ultra-high temperature shape memory alloy elements 12 and opens a flapper 16 of the valve (again, with increasing degrees of opening of the flapper 16 illustrated in series in FIGS. 1B, 1C, and 1D). Downward movement of the drive sleeve 14, and concomitant opening of the flapper 16, is opposed by one or more springs 18.

Figure 2:
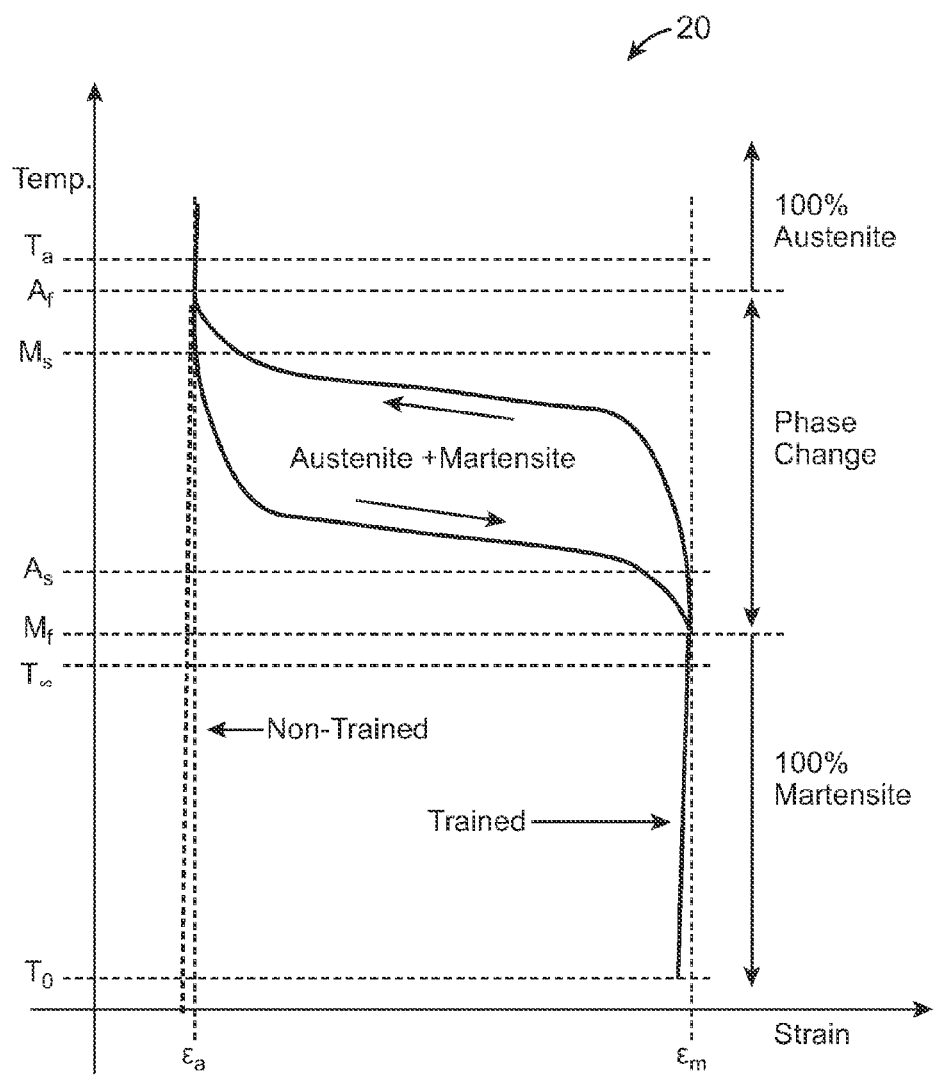
FIG. 2 is a temperature versus strain plot for shape memory alloy elements demonstrating the hysteresis of the temperature behavior for shape memory alloys in transition between martensite and austenite phases without mechanical loading.

FIG. 2 is a temperature versus strain plot 20 for shape memory alloy elements demonstrating the hysteresis of the temperature behavior for shape memory alloys in transition between martensite and austenite phases without mechanical loading. In particular, $\epsilon_m$ is the theoretical maximum strain of trained shape memory alloy in martensite phase, $\epsilon_a$ is the theoretical maximum strain of trained shape memory alloy in austenite phase, $A_s$ is the theoretical temperature that austenite crystal structure first appears, $A_f$ is the theoretical temperature at which the entire crystal structure becomes austenite, $M_s$ is the theoretical temperature that martensite crystal structure first appears, $M_f$ is the theoretical temperature at which the entire crystal structure becomes martensite, $T_\infty$ is the working environment temperature, and $T_0$ is a temperature (significantly) lower than $T_\infty$, wherein $T_0 < T_\infty \leq M_f < A_s < M_s < A_f \leq T_a$.

Some metal alloys (i.e., shape memory alloys) are "trainable" (i.e., can leave reminders of a deformed low-temperature condition in high-temperature phases) and exhibit a phase change while in solid form. One or more noble metals (e.g., palladium) can be added to such shape memory alloys (e.g., nickel-titanium alloy) in order to achieve a ultra-high temperature shape memory alloy.

As shown in FIGS. 3A-3D, which are schematics of crystal structures with major material properties for shape memory alloys, wire-shaped shape memory alloys are trained by applying certain repeated tension at alloy specific temperatures. When a trained shape memory alloy wire is heated to phase change temperature, the shape memory alloy wire aggressively contracts until the end of phase change, contrary to conventional expectations.

In particular, FIGS. 3A-3D show phase change and the effect of training on strain with variation in temperature without mechanical loading. FIG. 3A shows a non-trained 100% martensite phase at temperature=$T_0$ exhibiting strain $\epsilon_0$. After application of heat (H), FIG. 3B shows a non-trained 100% martensite phase (twinned martensite; twinning occurs when two separate crystals share some of the same crystal lattice points in a symmetrical manner) at temperature=$T_\infty$. exhibiting strain $\epsilon_m$. FIG. 3C shows a trained 100% martensite phase (de-twinned martensite) at temperature=$T_\infty$ exhibiting strain $\epsilon_t$. After application of heat (H), FIG. 3D shows a 100% austenite phase at temperature=$T_a$ exhibiting strain $\epsilon_a$. Additionally, $T_0 < T_\infty \leq M_f < A_s < M_s < A_f \leq T_a$; $\epsilon_0 < \epsilon_m < \epsilon_t$; and $\epsilon_a < \epsilon_t$.

FIGS. 4A-4E are sequential sectional views, in elevation, of a subsurface safety valve 40 (e.g., an electric surface controlled subsurface safety valve) being actuated between closed and opened positions via a ratcheting assembly 42 (also shown in FIGS. 5A-5B, described in further detail below) coupled with linear actuation via a shape memory alloy assembly comprised of cascading ultra-high temperature shape memory alloy elements. In particular, FIG. 4A shows the subsurface safety valve 40, comprising two ultra-high temperature shape memory alloys 44, 46, in a closed position with both ultra-high temperature shape memory alloys deactivated.

FIG. 4B also shows the subsurface safety valve 40 remaining in a closed position. While the ultra-high temperature shape memory alloy 46 illustrated on the right remains deactivated, the ultra-high temperature shape memory alloy 44 illustrated on the left is activating (i.e., the ultra-high temperature shape memory alloy is contracting). As a result of the activation of the ultra-high temperature shape memory alloy 44, the tooth of the ratcheting assembly 42 illustrated on the left is locking into the teeth 48 of a drive sleeve 50 of the valve, which opens a flapper 52 of the valve 40.

FIG. 4C shows the subsurface safety valve 40 opening. The ultra-high temperature shape memory alloy 44 illustrated on the left is fully activated. As a result of the full activation of the ultra-high temperature shape memory alloy 44, the drive sleeve 50 is moved down and starts to open the flapper 52 of the valve 40. In particular, while contraction of the ultra-high temperature shape memory alloy 44 initially serves to lock the tooth of the ratcheting assembly 42 in the teeth 48 of the drive sleeve 50 (see FIG. 4B), subsequent continued contraction (i.e., full activation) of the ultra-high temperature shape memory alloy 44 causes downward movement of the ratcheting assembly 42, and due to the engagement of the ratcheting assembly 42 with the drive sleeve 50, downward movement of the drive sleeve 50 as well.

As shown in FIG. 4C, downward movement of the ratcheting assembly 42 is opposed by a spring 54 underneath the ratcheting assembly 42, such that when the ultra-high temperature shape memory alloy 44 is deactivated, the ratcheting assembly 42 returns to a higher "neutral" position due to the spring 54 underneath the ratcheting assembly 42. As the drive sleeve 50 is moved down by the ratcheting assembly 42 illustrated on the left, while the ratcheting assembly 56 illustrated on the right is maintained in its "neutral" position, the ratcheting assembly 56 illustrated on the right will be located at a relatively higher position on the drive sleeve 50, and repeating the procedure described above with reference to FIGS. 4B and 4C, while reversing the functions of the ratcheting assemblies, will further open the safety valve.

Accordingly, FIG. 4D shows next step in the sequence. The ultra-high temperature shape memory alloy 46 illustrated on the right is activating, with the tooth of the ratcheting assembly 56 locking into the teeth 58 of the drive sleeve 50. FIG. 4E shows the subsurface safety valve 40 opening further. The ultra-high temperature shape memory alloy 46 illustrated on the right is fully activated; as a result, the drive sleeve 50 is moved down farther and further opens the flapper 52 of the valve 40. As the ultra-high temperature shape memory alloy 44 illustrated on the left is deactivated, the tooth of the ratcheting assembly 42 illustrated on the left is unlocked from the teeth 48 of the drive sleeve 50, and only the ultra-high temperature shape memory alloy 46 illustrated on the right is holding the drive sleeve 50 in position.

Figure 5A:
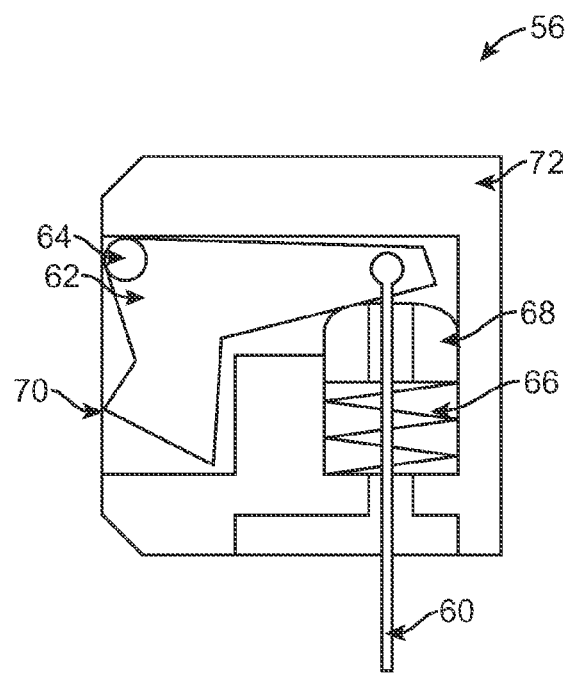
FIGS. 5A-5B are detailed schematic representations of components of the ratcheting assembly of FIGS. 4A-4E, showing deactivated and activated states, respectively.
Figure 5B:
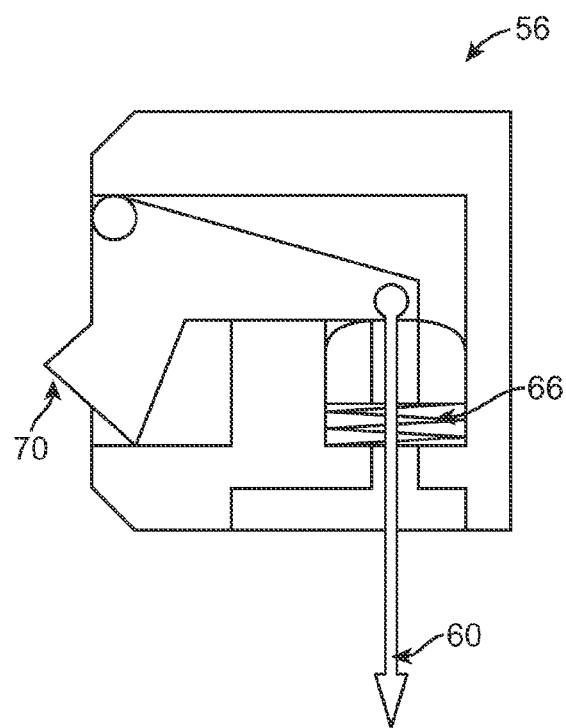

FIGS. 5A-5B are detailed schematic representations of components of the ratcheting assembly 56 (with similar applicability to ratcheting assembly 42) of FIGS. 4A-4E, showing deactivated and activated states, respectively. In particular, with reference to FIG. 5A, when the ultra-high temperature shape memory alloy 46 is deactivated (i.e., the "natural" position of the ratcheting assembly 56 at ultra-high temperature shape memory alloy temperatures of less than 428° F. (220° C.)), the rod 60 connecting the ultra-high temperature shape memory alloy 46 and the lever 62 of the ratcheting assembly 56, which rotates about pivot 64, is not pulled in a downward position toward the ultra-high temperature shape memory alloy 46, as it is when the ultra-high temperature shape memory alloy 46 is activated. As a result, spring 66, which is covered by spring cover 68, remains in an expanded state, and thus, tooth 70 is pulled inside of the body 72 of the ratcheting assembly 56. In contrast, with reference to FIG. 5B, when the ultra-high temperature shape memory alloy 46 is activated (i.e., the "actuated" position of the ratcheting assembly 56 at ultra-high temperature shape memory alloy temperatures of greater than 572° F. (250° C.)), the rod 60 connecting the ultra-high temperature shape memory alloy 46 and the lever of the ratcheting assembly 56 is pulled in a downward position toward the ultra-high temperature shape memory alloy 46. As a result, the spring 66 is compressed and tooth 70 is pushed outside of the body of the ratcheting assembly 56. As noted above with reference to FIG. 4C, continued activation of the ultra-high temperature shape memory alloy 42 causes downward movement of the ratcheting assembly.

Accordingly, provided is an actuator for use in actuating a valve to control the flow of fluids through the valve. The valve has a valve member movable between positions opening and closing the valve. The actuator comprises one or more shape memory alloy elements transformable from a martensitic to an austenitic state by applying sufficient heat energy to achieve an austenitic transformation. The shape memory alloy elements are connected to the valve member such that austenitic transformation of the one or more shape memory alloy elements induces movement of the valve member from its closing position to its opening position.

Each shape memory alloy element can be transformable from an austenitic state to a martensitic state by removing sufficient heat energy to achieve a martensitic transformation, such that martensitic transformation of the one or more shape memory alloy elements induces movement of the valve member from its opening position to its closing position. The austenitic transformation can occur in a temperature range between a start temperature of the austenitic transformation, which is higher than ambient temperature, and a finish temperature of the austenitic transformation, while the martensitic transformation can occur in a temperature range between a start temperature of a martensitic transformation and a finish temperature of the martensitic transformation, which is higher than ambient temperature. The austenitic transformation can effect a contraction of the one or more shape memory alloy elements so as to induce movement of the valve member from its closing position to its opening position, while the martensitic transformation can effect an expansion of the one or more shape memory alloy elements so as to induce movement of the valve member from its opening position to its closing position.

Also provided is a subsurface (safety) valve for controlling the flow of fluids through a wellbore. The subsurface valve comprises a valve body adapted for disposal in the wellbore and having a fluid flowpath therethrough; a valve member movably carried by the valve body between positions opening and closing the fluid flowpath; and one or more shape memory alloy elements transformable from a martensitic to an austenitic state by applying heat energy to achieve an austenitic transformation. The one or more shape memory alloy elements are connected to the valve member such that austenitic transformation of the one or more shape memory alloy elements induces movement of the valve member from its closing position to its opening position.

The valve member can comprise a flow tube. The subsurface valve can further comprise a control line for conducting heat energy from the surface to the one or more shape memory alloy elements. The control line can comprise one or more electrically conductive pathways for conducting electrical current across the one or more shape memory alloy elements, and the one or more shape memory alloy elements exhibit sufficient electrical resistance to generate sufficient heat energy under ordinary voltage to achieve an austenitic transformation.

The one or more shape memory alloy elements can comprise two or more ultra-high temperature shape memory alloy assemblies having a plurality of cascading ultra-high temperature shape memory alloy elements disposed in a thermally insulated housing carried within the valve body. The two or more ultra-high temperature shape memory alloy assemblies can be operatively coupled to a ratchet mechanism for inducing movement of the valve member. Each of the cascading ultra-high temperature shape memory alloy elements can be suitable to operate in wellbore ambient temperatures up to 428° F. (220° C.). Each shape memory alloy element can comprise a NiTiPd alloy. The one or more shape memory alloy elements can be disposed in pressure balanced housing carried within the valve body, the housing comprising a temperature expansion compensator that is suitable for high pressure, high temperature wellbore applications.

Additionally provided is a method for actuating a valve disposed in a wellbore to control the flow of fluids through the wellbore. The valve has a valve member movable between positions opening and closing the valve. The method comprises the steps of connecting the valve member to one or more shape memory alloy elements transformable from a martensitic to an austenitic state by applying heat energy and applying sufficient heat energy to the one or more shape memory alloy elements to achieve an austenitic transformation. The austenitic transformation of the one or more shape memory alloy elements induces movement of the valve member from its closing position to its opening position.

The heat energy-applying step can comprise establishing one or more pathways for conducting electrical current across the one or more shape memory alloy elements and applying voltage across the one or more shape memory alloy elements via the one or more pathways to generate sufficient heat energy to achieve an austenitic transformation. The voltage can be provided via an electrical supply selected from a group comprising AC, DC and high voltage pulse width modulation.

While various embodiments have been described, it is to be understood that variations and modifications may be resorted to as will be apparent to those skilled in the art. Such variations and modifications are to be considered within the purview and scope of the claims appended hereto.

Additional descriptions of various embodiments of the present disclosure are made via annotations to the figures, and will be understood to exemplify certain aspects of the present disclosure to those having ordinary skill in the art.

It will be understood from the foregoing description that various modifications and changes may be made in the embodiments of the present disclosure without departing from its true spirit. For example, although the figures illustrate embodiments of the present disclosure in the context of a subsurface safety valve, the concept of applying shape memory alloy operation to effect linear actuation may be implemented in any number of valve apparatuses, including various surface, mudline and subsurface valve types and applications. Additionally, shape memory alloy elements may have utility to maintain a valve apparatus in a latched position against a spring-biasing force.

The present description is intended for purposes of illustration only and should not be construed in a limiting sense. The scope of the present disclosure should be determined only by the language of the claims that follow. The term "comprising" within the claims is intended to mean "including at least" such that the recited listing of elements in a claim are an open set or group. Similarly, the terms "containing," "having," and "including" are all intended to mean an open set or group of elements. "A," "an" and other singular terms are intended to include the plural forms thereof unless specifically excluded.

What is claimed is:

1. An actuator for use in actuating a valve to control the flow of fluids through the valve, the valve having a valve member movable between positions opening and closing the valve, the actuator comprising:

plural shape memory alloy elements, each being transformable from a martensitic to an austenitic state by applying heat energy sufficient to achieve an austenitic transformation, wherein a first portion and a second portion of the plural shape memory alloy elements are each connected to a respective ratchet mechanism that is operably coupled to the valve member such that austenitic transformation of the plural shape memory alloy elements induces movement of the valve member from its closing position to its opening position, the valve member comprising a flow tube.

2. The actuator of claim 1, wherein each shape memory alloy element is transformable from an austenitic state to a martensitic state by removing sufficient heat energy to achieve a martensitic transformation, such that martensitic transformation of the plural shape memory alloy elements induces movement of the valve member from its opening position to its closing position.

3. The actuator of claim 2, wherein the martensitic transformation occurs in a temperature range between a start temperature of a martensitic transformation and a finish temperature of the martensitic transformation, the finish temperature of the martensitic transformation being higher than ambient temperature immediately surrounding the actuator.

4. The actuator of claim 2, wherein the martensitic transformation effects an expansion of the plural shape memory alloy elements so as to induce movement of the valve member from its opening position to its closing position.

5. The actuator of claim 1, wherein the austenitic transformation occurs in a temperature range between a start temperature of the austenitic transformation and a finish temperature of the austenitic transformation, the start temperature of the austenitic transformation being higher than ambient temperature immediately surrounding the actuator.

6. The actuator of claim 1, wherein the austenitic transformation effects a contraction of the plural shape memory alloy elements so as to induce movement of the valve member from its closing position to its opening position.

7. The actuator of claim 1, wherein the valve is a subsurface safety valve adapted for disposal in a wellbore.

8. A subsurface valve for controlling the flow of fluids through a wellbore, comprising:
 a valve body adapted for disposal in the wellbore and having a fluid flowpath therethrough;
 a valve member movably carried by the valve body between positions opening and closing the fluid flowpath; and
 shape memory alloy elements each being transformable from a martensitic to an austenitic state by applying heat energy sufficient to achieve an austenitic transformation;
 the shape memory alloy elements being operably coupled to the valve member such that austenitic transformation of the shape memory alloy elements induces movement of the valve member from its closing position to its opening position, the valve member movement in one direction induced by a first portion of the shape memory elements followed by a second portion of the shape memory elements, one of the first and second portions deactivated when the other of the first and second portions is activated during the valve member movement in the one direction.

9. The subsurface valve of claim 8, wherein each shape memory alloy element is transformable from an austenitic state to a martensitic state by removing the heat energy to achieve a martensitic transformation, such that martensitic transformation of the shape memory alloy elements induces movement of the valve member from its opening position to its closing position.

10. The subsurface valve of claim 9, wherein the martensitic transformation occurs in a temperature range between a start temperature of a martensitic transformation and a finish temperature of the martensitic transformation, the finish temperature of the martensitic transformation being higher than ambient wellbore temperature.

11. The subsurface valve of claim 9, wherein the martensitic transformation effects an expansion of the shape memory alloy elements so as to induce movement of the valve member from its opening position to its closing position.

12. The subsurface valve of claim 8, wherein the austenitic transformation occurs in a temperature range between a start temperature of the austenitic transformation and a finish temperature of the austenitic transformation, the start temperature of the austenitic transformation being higher than ambient wellbore temperature.

13. The subsurface valve of claim 8, wherein the austenitic transformation effects a contraction of the shape memory alloy elements so as to induce movement of the valve member from its closing position to its opening position.

14. The subsurface valve of claim 8, wherein the valve member comprises a flow tube.

15. The subsurface valve of claim 8, further comprising a control line for conducting heat energy from the surface to the shape memory alloy elements.

16. The subsurface valve of claim 15, wherein the control line comprises one or more electrically conductive pathways for conducting electrical current across the shape memory alloy elements, and the shape memory alloy elements exhibit sufficient electrical resistance to generate sufficient heat energy under ordinary voltage to achieve an austenitic transformation.

17. The subsurface valve of claim 8, wherein the two or more ultra-high temperature shape memory alloy assemblies are operatively coupled to a ratchet mechanism for inducing movement of the valve member.

18. The subsurface valve of claim 17, wherein each shape memory alloy element comprises a NiTiPd alloy.

19. The subsurface valve of claim 8, wherein each of the cascading ultra-high temperature shape memory alloy elements of the first and second portions is suitable to operate in wellbore ambient temperatures up to 428° F. (220° C.).

20. A method for actuating a valve disposed in a wellbore to control the flow of fluids through the wellbore, the valve having a valve member movable between positions opening and closing the valve, the method comprising:
 operably coupling the valve member to one or more shape memory alloy elements at first and second locations of the valve member, the one or more shape memory alloy elements each being transformable from a martensitic to an austenitic state by applying heat energy; and
 applying sufficient heat energy to the one or more shape memory alloy elements to achieve an austenitic transformation, whereby the austenitic transformation of the one or more shape memory alloy elements induces at the first location a first movement of the valve member from its closing position to a first opening position and at the second location a second movement of the valve member from the first opening position to a fully open position.

21. The method of claim 20, wherein each shape memory alloy element is transformable from an austenitic state to a martensitic state by sufficiently removing the heat energy, and further comprising the step of removing the heat energy to achieve a martensitic transformation, whereby the martensitic transformation of the one or more shape memory alloy elements induces movement of the valve member from its opening position to its closing position.

22. The method of claim 21, wherein the martensitic transformation occurs in a temperature range between a start temperature of a martensitic transformation and a finish temperature of the martensitic transformation, the finish temperature of the martensitic transformation being higher than ambient wellbore temperature.

23. The method of claim 21, wherein the martensitic transformation effects an expansion of the one or more shape memory alloy elements so as to induce movement of the valve member from its opening position to its closing position.

24. The method of claim 20, wherein the austenitic transformation occurs in a temperature range between a start temperature of the austenitic transformation and a finish temperature of the austenitic transformation, the start temperature of the austenitic transformation being higher than ambient wellbore temperature.

25. The method of claim 20, wherein the austenitic transformation effects a contraction of the one or more shape memory alloy elements so as to induce movement of the valve member from its closing position to its opening position.

26. The method of claim 20, wherein the heat energy-applying step comprises establishing one or more pathways for conducting electrical current across the one or more shape memory alloy elements, and applying voltage across the one or more shape memory alloy elements via the one or more pathways to generate sufficient heat energy to achieve an austenitic transformation.

27. The method of claim 26, wherein the voltage is provided via an electrical supply selected from a group comprising AC, DC and high voltage pulse width modulation.

* * * * *